United States Patent [19]
Sivetz

[11] 3,964,175
[45] June 22, 1976

[54] COFFEE ROASTING SYSTEM

[76] Inventor: Michael Sivetz, 3635 NW. Elmwood Drive, Corvallis, Oreg. 97330

[22] Filed: Nov. 11, 1974

[21] Appl. No.: 522,485

[52] U.S. Cl. .................................. 34/57 A; 34/10; 432/58; 426/467
[51] Int. Cl.² ........................................ F26B 17/10
[58] Field of Search .................... 99/286, 483, 484; 34/10, 57, 57 A–57 D, 46, 53; 432/58, 14, 15, 85; 426/466–469

[56] References Cited
UNITED STATES PATENTS

| | | | |
|---|---|---|---|
| 2,509,765 | 5/1950 | Forse | 34/57 C |
| 2,574,848 | 11/1951 | Schroeder | 34/57 R X |
| 2,969,038 | 1/1961 | Neumann | 34/57 A R |
| 3,028,681 | 4/1962 | Jorman et al. | 34/57 A |
| 3,186,102 | 6/1965 | Brociner et al. | 34/57 A X |
| 3,360,867 | 1/1968 | Sanderson | 34/10 |
| 3,480,265 | 11/1969 | Deve | 34/57 A X |
| 3,546,787 | 12/1970 | Horner et al. | 34/57 A |
| 3,585,732 | 6/1971 | Itahashi | 34/57 A |
| 3,609,874 | 10/1971 | Nara | 34/57 A |
| 3,615,668 | 10/1971 | Smith, Jr. | 34/57 A |

Primary Examiner—Peter Feldman
Attorney, Agent, or Firm—Owen, Wickersham & Erickson

[57] ABSTRACT

A coffee bean roasting system is disclosed wherein coffee beans in a box-like chamber are levitated as a dense, uniformly recirculating mass by an upwardly directed airstream. The air is heated to a temperature not in excess of 530°F., and the heat is transferred to the beans primarily by convection and secondarily by conduction from bean to bean. Heat transfer continues until after a thermally induced pyrolitic reaction has occurred within the bean mass and the desired roast has resulted whereupon the roasted beans are cooled. The system may employ batch type or continuous roast apparatus.

24 Claims, 9 Drawing Figures

COFFEE ROASTING SYSTEM

BACKGROUND OF THE INVENTION

The present invention is an improved processing apparatus for efficiently transferring heat from air to coffee beans to secure a uniform roasting thereof.

Accepted commercial coffee bean roasting methods have not undergone any significant recent improvements in efficiency or simplification. The principles employed in widely utilized coffee roasters are virtually the same as used over 50 years ago. One exception is that about 40 years ago a continuous rotary cylinder roasting machine was developed by the Jabez Burns & Sons, Inc. Company in the United States. The commonly utilized prior art roasters employed rotating steel cylindrical roast chambers which held the coffee bean charge occupying only about 15 percent of roast chamber volume, and which cylinder was rotated about a horizontal axis at rates of typically 60 to 90 revolutions per minute. Hot recirculatory gases are passed about and through the cylinder, but not necessarily through the beans therein, at temperatures from 650° to 700°F., or even higher. Coffee roasting times varied from 10 to 30 minutes, and uniform roasting of each bean was not routinely achieved.

Smoke, smog, organic fumes and aerosols of fine oil were abundantly liberated during roasting operations in such prior art coffee roasters. With the enactment and enforcement of air quality control standards by federal, state and municipal authorities, coffee roasting firms have become obligated to make large capital expenditures for air pollution control devices such as "after burners," the operation of which has doubled fuel consumption and operating costs.

The movement of hot gases through the roasting beans has not been positively controlled. Some beans were always scorched (tipped) or burned due to remaining in contact with the very hot metal cylinder walls more than a few seconds. The high temperature of the gases used permitted shortened roasting times, for example, 5 minutes, with the concomitant drawback that the beans were less uniformly roasted, many beans were scorched and excessive volatiles, vegetable oils, char and degraded organics were liberated from the beans which in turn degraded coffee flavor as well as generated abundant air pollutants.

Coffee volatiles are rich in aromatic aldehydes and ketones, chemical constituents which are very unstable at the temperatures typically found within these prior art roasting cylinders. In seconds, oxidized and polymerized byproducts were formed from liberated aldehydes, and these chemical byproducts became smokey, and by contact contaminated the clean beans being roasted, thereby adversely affecting the produced flavor quality. And, in combination with loosened chaff, these organic byproducts coated the cylinder walls and other apparatus with which they came into contact. Frequent cleaning and removal of the charred oily encrusted coating has been essential in order to minimize coffee bean contamination and fire hazards. In addition, high temperature roasting produced harmful insolubles such as the carcinogens noted in the 1974 U.S. Pat. No. 3,809,775 to Ganiaris.

Further details and drawbacks of widely used commercial roasting methods and machines may be found in Volume 1, pages 203 to 226, 235 to 238, of my two volume work entitled *Coffee Processing Technology*, published by the AVI Publishing Co. Inc., Westport, Conn., in 1963.

There have been a number of prior art efforts directed to a process of fluidization of coffee bean mass to achieve an improved roast. One such effort may be found in the 1958 U.S. Pat. No. 2,859,116 to Heimbs et al. This reference teaches the roasting of a coffee bean type material by a fresh upward hot air suspension of the beans in vertically conical roasting chamber. However, the patent does not disclose how to control the bean fluidization and the chamber temperature to produce a uniform bean roast without burning. The undesirable roasting vapor organic byproducts generated by the Heimbs method had to be purified before recirculation of the heating gas, a limitation overcome with the present invention.

In a 1962 U.S. Pat. No. 3,060,590 to Brown, a complicated continuous flow apparatus achieving fluidization of a thin sheet of solid particles by a plurality of downwardly directed air blast tubes is shown. The apparatus therein is vastly different from the present invention, and it is not particularly directed to roasting coffee beans. The process disclosed therein is incapable of creating a dense cubic floating bed of coffee beans in recirculating fluidized mass. Also, heat is lost by conduction from the bottom metal conveyor. An even more complicated downdraft apparatus is shown in Brown's 1966 U.S. Pat. No. 3,263,339 wherein baffles and deflectors are employed in an effort to thicken the fluidized particulate mass being processed. The complications and disadvantages of the Brown devices are made unnecessary by the present invention.

Another prior art reference disclosing a species of fluidization is the 1954 U.S. Pat. No. 2,876,557 to Ducatteau. That continuous processing apparatus reference discloses only in general terms a complex series of baffled compartments in which various upward air currents lift particles from one processing location to another, but gives no details to cover the processing of coffee beans therein. It is doubtful from the information actually supplied that successful coffee bean roasting could be accomplished by such an apparatus. The present invention is vastly different in both method and apparatus from that shown in the Ducatteau reference.

A 1964 U.S. Pat. No. 3,149,976 to J. L. Smith, Jr., assigned to Blaw-Knox Co. of Pittsburgh, Pa., shows a columnar roasting apparatus wherein fluidized particles cascade downwardly from plate to plate while warm air passes upwardly through the particles. That process and apparatus bears no resemblance to the present invention.

A 1969 U.S. Pat. No. 3,486,240 to Nowak et al, also assigned to Blaw-Knox, discloses a complicated multi-level and radially extending multi-chamber carousel type roasting device employing a heated gaseous fluid updraft to fluidize particles. Baffle members and carefully aligned gas nozzles are utilized in the device to create an involved mushroom spraying effect within the particulate material being treated. The complications of apparatus and method disclosed therein are avoided in the present invention.

In another patent assigned to the Blaw-Knox Company, the 1968 U.S. Pat. No. 3,370,522 to Anderson et al, a high speed fluidization of roasting coffee beans is achieved in a complicated pressurized environment involving humidified heated gas and a pressure release. Such complicated processing apparatus and complicated processing requirements are shown to be unnecessary by the present invention.

Finally, several patents issued to H. L. Smith, Jr., U.S. Pat. Nos. 3,189,460, (1965); 3,328,894 (1967); 3,329,506 (1967); 3,345,181 (1967); 3,385,199 (1968); 3,447,338 (1969); 3,615,668 (1971 ) and 3,724,090 (1973) disclose pressurized roasting methods that employ a form of bean fluidization. The pressurized inert gas processes disclosed in those patents are of primary usefulness only in the roasting of the lower grades of Robusta coffee beans, wherein it is desirable to increase the acidity of the coffee bean to improve taste acceptance. The Smith apparatus is complicated by the requirement of inert gas pressurization, recycle condensate purge processes and rotating turret roast chambers which disadvantages, as well as others, are overcome by the present invention.

In view of the foregoing, a general object of the present invention is to provide an improved and simplified apparatus for batch or continuous roasting coffee beans that achieves a uniformity of bean roast not achieved by prior art methods.

Another object of the present invention is to transfer heat from air into each coffee bean within a fluidized bed at a uniform and controlled rate, so that heating of each bean is uniform and equilibrated, and so that there is no excessive temperature exposure, scorching or burning of any bean or portion thereof.

A closely related object of the present invention is to roast air mobilized coffee beans at a controlled low temperature which produces pyrolysis within the beans as evidenced by a darker bean cell interior than surface, and yet the roasting temperature does not liberate essential volatiles and oils from the beans thereby retaining the taste producing elements.

A further related object is to roast beans in a way and at a temperature that does not produce contaminating or polluting organic byproducts thereby enabling the roasting apparatus to remain clean and uncontaminated throughout repeated roasting cycles and further enabling the discharge of expended roasting gas into the atmosphere without introduction of undesirable air pollutants.

Still further objects of the present invention are to provide a batch or continuous coffee roasting apparatus that overcomes the limitation of prior art fluidized bed coffee roasters, that has a size which may be varied from industrial capacity to home use, and that is uncomplicated in design, inexpensive to manufacture, simple and inexpensive to operate, and that requires very little cleaning or maintenance.

SUMMARY OF THE INVENTION

These and other objects of the present invention are accomplished by introducing a heated gaseous fluid such as heated air upwardly into a bed of unroasted coffee beans to produce a slightly expanded yet dense and recirculating layered mass of coffee beans which are dried and then roasted. The supply air is warmed usually to a temperature of about 450°F., but always less than 530°F., and the heat is transferred into each bean primarily by convection from the heated air, and then the heat is secondarily equilibrated by thermal conduction from bean to bean throughout the moving mass. The constant recirculating movement of the beans within the dense mass enables thermal equilibrium to be achieved thereby resulting in uniformly roasted beans, batch after batch or continuously. The rubbing action between the beans helps to release chaff which is promptly carried away by the heated airstream thereby producing clean, smooth, shiny bean surfaces which enable an accurate assessment of natural bean quality. Roasting typically continues for about twenty minutes depending upon the bean properties, operating conditions chosen and degree of roast. The optimum roasting period may be determined in all but the most inferior coffee beans by a detectable change in heating rate or thermal bump occuring when the beans reach about 400°F. At this point, pyrolitic chemical reactions begin to occur within each bean which produce the preferred coffee aroma and taste constituents.

The foregoing method may be implemented in a batch roaster by placing a charge of unroasted coffee beans into a simple box-like roasting chamber having a perforated base plate through which heated air is jetted. Walls extend upwardly from the base plate and divergently therefrom. The airflow is directed to focus slightly into or tangentially to a first wall so that the jetted airstreams generate upward bean movement and a welling up bean recirculation in the portion of the recirculating bean mass adjacent to the first wall. A blower forces heated air into a plenum chamber and thence through the perforated base plate. The blower imparts a high velocity to the airstreams which enables the beans to be levitated locally and then to recirculate as a dense mass having substantial bean to bean contact. A heating system in the plenum or before the blower raises the temperature of the air to a range from about 450° to 530°F., before it passes through the base plate and into the roasting chamber to move the beans as a densely recirculating mass.

The drying and roasting cycle continues for about fifteen to twenty minutes depending upon the particular grade of beans whether a light or a dark roast is desired. No polluting volatiles are liberated during the roasting cycle except for a trace in the last minutes of the roast, and the spent air may be vented directly to the atmosphere from the roasting chamber without evidence of smoke. If desired, a simple recirculation duct may be employed to conserve heat. Chaff is easily removed from the exhausting air by a suitable chaff cyclone employing well known principles. During repeated roasting cycles coffee beans have been evenly and uniformly roasted, and there have been no instances of air pollution, nor oily or charred deposits of organic material on the contact surfaces of the roasting chamber.

The method of the present invention may be implemented in a continuous roaster made up of a series of interconnected "batch" roasters situated at descending elevations to enable continuous gravity flow from an unroasted bean inlet to a roasted and cooled bean outflow. Unroasted coffee beans are continuously fed into one end of a long and narrow double zone dryer stage wherein the beans become levitated into a densely fluidized recirculating mass by a warmed air updraft at the first zone and a hot air updraft at the second. Water content of the beans is reduced from about 12 percent to about 1 percent in the dryer stage, whereupon the beans pass over a weir at the other end of the stage and downwardly through a chute into roaster stage wherein the beans swell, release chaff and are evenly roasted. The beans move horizontally across the roaster stage and exit over another weir and down a chute to the cooling stage where they are met by a cooling water spray and then a fluidizing updraft of air at ambient room temperature. The beans pass out of the cooling stage and may be carried to a packaging operation by a suitable conveyor. Horizontal bean flow throughout the continuous roaster is accomplished by the use of long narrow stages and by continuously introducing unroasted beans into the inlet and continuously withdrawing a like amount of roasted beans from the outflow. Constant monitoring of bean temperatures enables the bean inflow and outflow rates to be precisely controlled. As chaff is released only incident to actual roasting, chaff removal equipment need only be connected to the roaster stage.

Typically, the coffee beans are within the drying stage for about 9 minutes; the roaster stage for about 1½ minutes and the cooling stage for about 5 minutes. As previously stated the actual times depend upon the type of beans being roasted, and whether a light or dark roast is desired. The separate cooling stage shortens the processing cycle because of the radical temperature drop effected by the water spray. Such a cooling spray is equally applicable to the batch and continuous roasters.

Other objects, advantages and features of the invention will become apparent from the following detailed description of a preferred embodiment, presented with the accompanying drawings.

DETAILED DESCRIPTION OF THE PREFERRED EMBODIMENTS

Figures 1, 2:
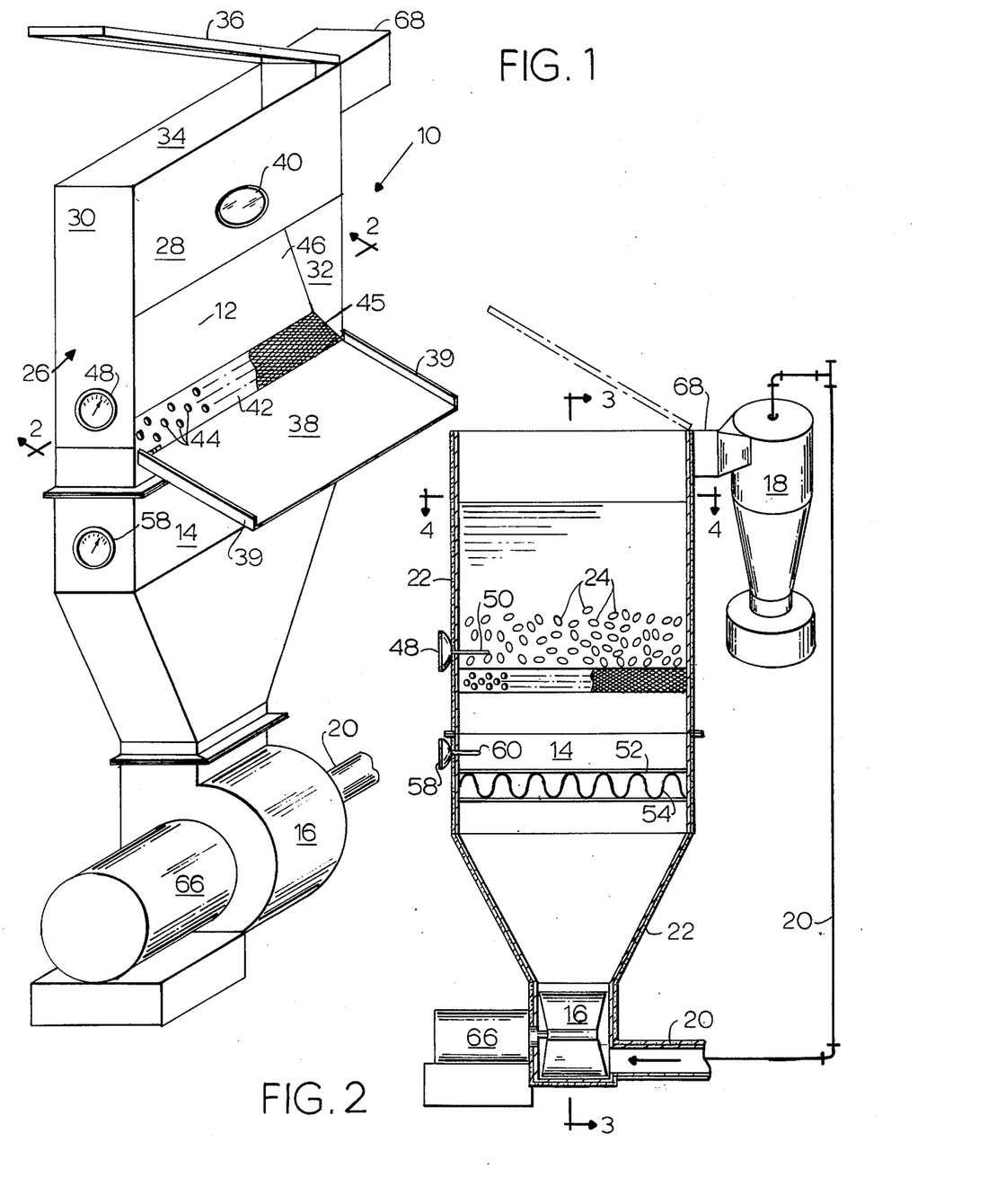
FIG. 1 is a view in perspective of one embodiment of a batch type coffee roasting apparatus employing the principles of the present invention with the top cover and discharge door open and with the screen broken away.
FIG. 2 is a sectional view in front elevation of the apparatus of FIG. 1 taken along line 2—2. A chaff collection cyclone and the air vent and recirculation duct are shown connected, and a portion of the duct is depicted diagrammatically.
Figure 3:
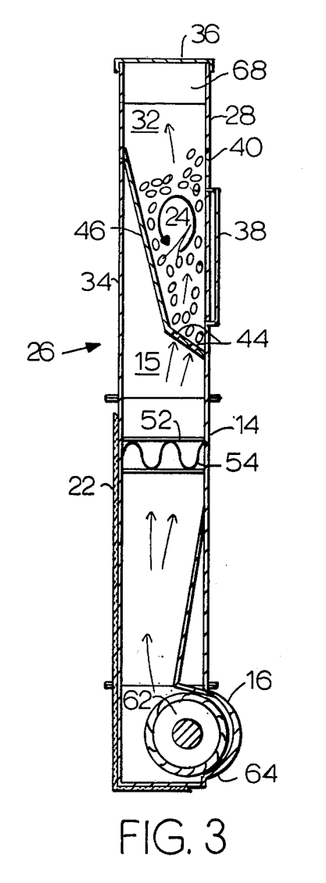
FIG. 3 is a sectional view in side elevation of the apparatus of FIG. 1 taken along line 3—3 shown with the discharge door closed and with a fluidized recirculating charge of coffee beans.
Figure 4:
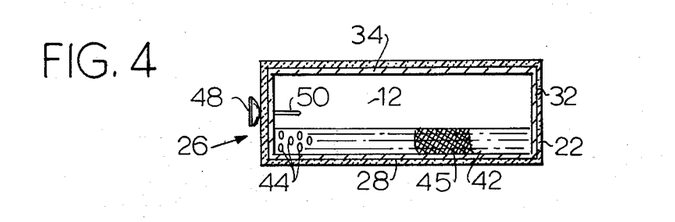
FIG. 4 is a plan view in section of the apparatus of FIG. 1 taken along line 4—4 and shown without a charge of coffee beans.
Figure 5:
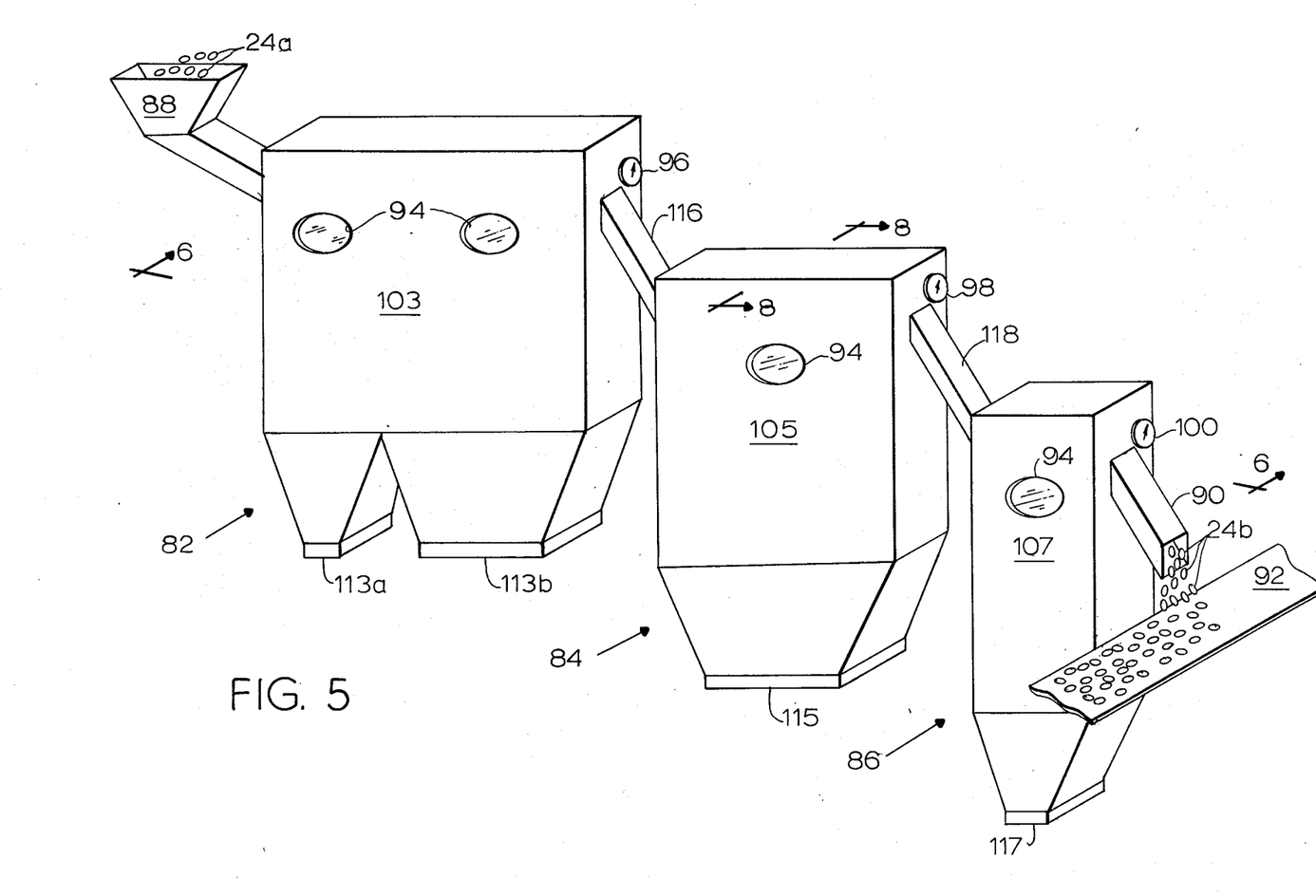
FIG. 5 is a view in perspective of one embodiment of a continuous coffee roasting apparatus employing the principles of the present invention. The conveyor belt is broken away to conserve space.
Figures 6, 7:
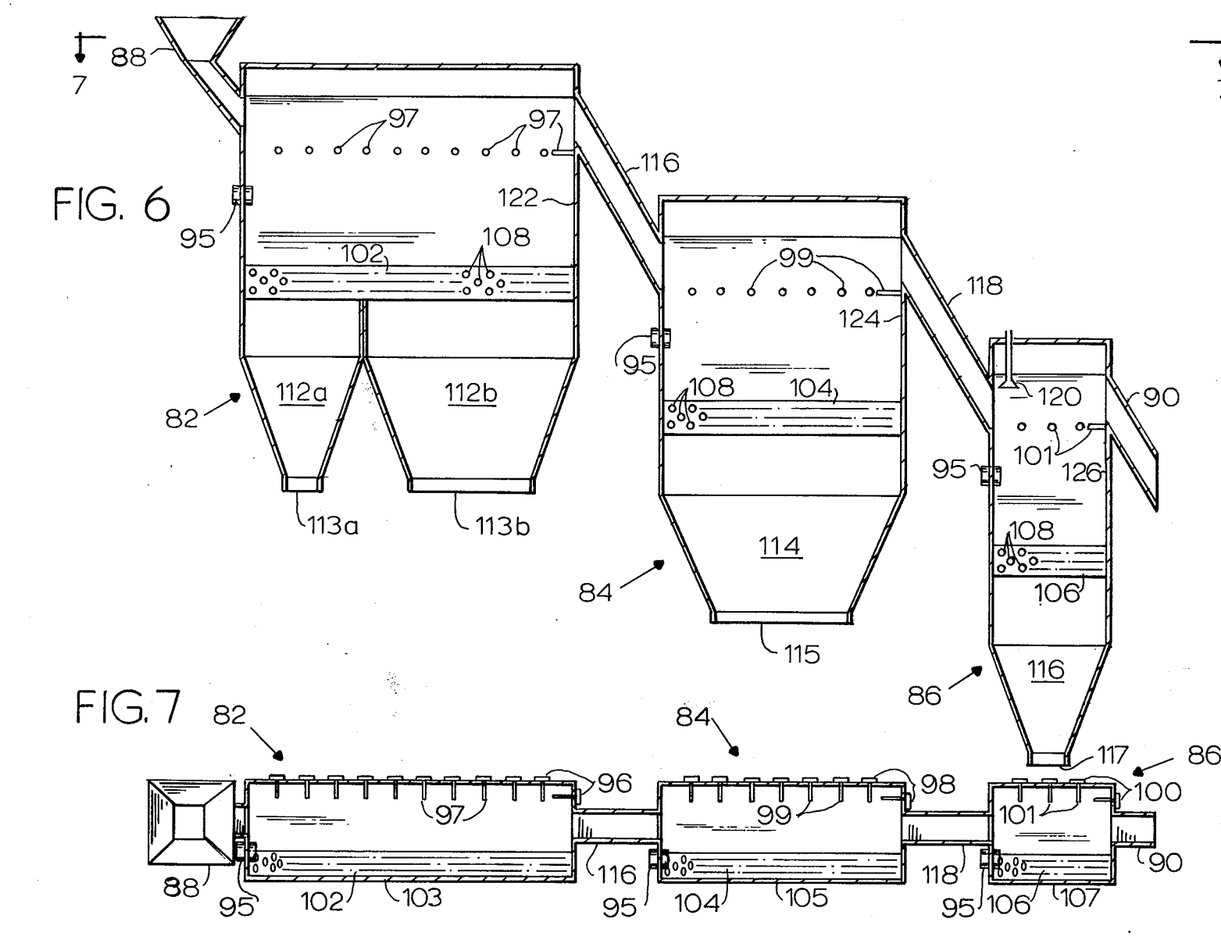
FIG. 6 is a sectional view in front elevation of the apparatus of FIG. 5 taken along line 6—6.
FIG. 7 is a top plan view of the apparatus of FIG. 6 with the top covers of the stages removed and without coffee beans therein.

A batch type coffee roaster 10 employing the principles of the present invention is illustrated in FIGS. 1–4 and requires four basic elements: a roasting chamber 12, a heater system 14, a heated air plenum 15 and a blower 16. Other elements such as a cyclone collector 18, air recirculation duct 20, and thermal insulation 22 are preferably utilized but are not an essential part of the invention. A charge of coffee beans 24 undergoing roasting is shown in FIGS. 2 and 3. The roaster 10 may be sized to process several pounds of beans, or it may be enlarged to batch roast bags of coffee beans in commercial quantities. Regardless of the size of the roaster, the principles of apparatus design and processing method disclosed herein remain substantially the same.

In the batch roaster embodiment shown in FIGS. 1–4, the roasting chamber 12 is an elongated rectangular box-like housing 26 having a long front wall 28, an outer back wall 34, two short sidewalls 30, 32, and a hinged top loading cover 36. Unloading access to the chamber is achieved through a bottom hinged drop down unloading door 38 extending across the lower front wall 38 and flush with an air distributor plate 42. The door 38 has sidewalls 39 to form a chute enabling rapid loading and unloading of the chamber 12. Above the door 38 is a sight glass 40 through which bean movement and color change of the beans 24 from green to brown may be observed during a drying and roasting operation cycle.

The perforated airflow distributor base plate 42 extends across the width of the chamber at the bottom and is considerably narrower than the width of the sidewalls 30 and 32. The plate 42 is inclined toward the front wall 28 at about 30°. A multiplicity of orifices 44 are spaced throughout the distributor plate 42 and are aligned to create an airstream (shown by light arrows in FIG. 3) substantially tangential to the front wall 28 and door 38. The orifices 44 are typically in excess of three sixteenths inch in diameter which represents the usual size of the smallest type of coffee bean found in export trade of good quality coffee beans. The particular orifice size is selected to achieve an economical balance in air lifting capacity between blower capacity and air flow rates which are directly influenced by the depth of green coffee beans in the roast chamber. In the event that the size selected for the orifices 44 approaches or exceeds the size of the beans 24 that will be roasted, a screen 45 having a suitable mesh may be placed over the distributor plate 42 to prevent the beans from lodging in, or falling through, the orifices 44, without unduly impeding the air flow.

An inner inclined plate 46 is joined to the distributor plate 42 along the back edge thereof and forms the inner back wall of the roast chamber 12 and the inclined plate 46 extends upwardly and toward the outer back wall 34 so that it diverges away from the front wall 28, and functions to guide the descending portion of the recirculating beans 24 back into the air lift stream adjacently above the base plate 42 so that a dense recirculating fluidized mass thereof is achieved. The inclined air distribution plate 42 is joined along its upper edge to the outer back wall 34.

Bean temperatures are indicated by a dial thermometer 48 mounted in the roast chamber left sidewall 30. The thermometer 48 is joined to a thermocouple sensor probe end 50 which extends horizontally into the chamber above the distributor plate at a location where the fluidized beans are very densely packed and out of the airstream so that the true bean temperatures within the mass of moving beans 24 is continuously indicated during roasting. A chart recorder may also be employed to record the bean temperatures during each roast cycle. In addition the probe 50 may be connected to provide automatic thermostatic temperature control of the heater system 14. Thus, shut down of the heater system may be controlled automatically when a predetermined maximum set bean temperature is reached within the roast chamber 12.

The roast chamber housing 26 is joined at its base to a heater system 14 comprising an enclosure forming the heated air plenum 15 for conducting heated air through the multiple orifices 44 of the distributor plate 42. The heater system 14 contains a heater element 52 capable of imparting sufficient temperature rise to an airflow stream passing through the heater box to enable the airstream to heat the beans to the desired roast temperature range of 450° to 530°F. air. The heater element 52 may be an electric heating element 54 or it may be a direct fired natural gas burner positioned before or after the blower. In smaller roasters, the electric heater element 54 after the blower is preferred, whereas in larger commercial roasters, the gas burner before the blower may be more practical. Other forms of heater elements may be employed so long as no undesirable combustion gases or coffee reaction products are brought into contact with the beans 24 being roasted. Vented air may be recycled through the air recirculation duct 20 to conserve heat. A heater enclosure thermometer 58 in conjunction with a probe 60 is positioned to indicate the plenum air temperature after the heater element.

The heater system 14 is joined at its base to the blower assembly 16 which forces air upwardly through the heater element 52 and the perforated air distributor plate 42 and into the bean roast chamber 12 with sufficient air velocity to move the beans 24 therein up the front wall as a dense and constantly recirculating fluidized bean mass. The preferred air volume and velocity developed by the blower 16 and distributed by the plate 42 will expand the volume of the bed of beans 24 only about twenty to thirty percent over the volume of the beans at rest in the chamber before and/or after roasting. In practice a single stage multiblade 3600 r.p.m. centrifugal pressure blower 62 in an enclosed housing 64 has been found to provide ample air flow and pressure. An electric motor 66 is usually used to drive the fan.

An exhaust duct 68 is connected to the roast chamber at the top of the right sidewall 32 to enable outflow of the still warm air after it has passed through the mobilized beans 24. The spent air may be recycled through the recirculation duct 20 to conserve heat. A chaff collection cyclone 18 typically forms a necessary part of the vented air or recirculated air roast system. The cyclone employs well known principles and does not form a part of the present invention. Thermal insulation 22 such as fiber glass wool is placed around the roast chamber 12, inlet plenum 15 and the recirculation duct 20 to minimize heat losses and conserve temperature thereby reducing fuel costs and sustaining needed temperatures in the system.

ROASTER OPERATION DESCRIBED

The loading cover 36 is opened upwardly and a charge of green coffee beans 24 is dumped into the roasting chamber 12. The cover 36 is closed and the blower 16 is turned on, followed by the heater system 14. Heated air with progressively higher temperatures then passes into the roasting chamber 12 through the orifices 44 as indicated by the light arrows in FIG. 3 and heats the beans 24 as they are simultaneously moved into a densely fluidized and constantly recirculating mass. Because of the acute angle of the distributor plate 42 with respect to the front wall 28, the hot air is directed upwardly along the inside of the door 38 causing a somewhat higher level of beans adjacent to the front wall 28. The beans roll out of the airstream by gravity and move toward the inner back wall 46 and are then guided downwardly by the inclined wall 46 to the base plate whereupon the beans reenter the hot airstream and are elevated as before, thereby completing a cycle of recirculation.

After about 10 to 20 minutes of roasting time and when the bean temperature has reached the range of 410° to 430°F., as indicated by the dial thermometer 48, depending upon whether the particular desired roast will be light or dark, roasting is terminated by cutting off the heater element 52. Cooling ambient air from the blower 16 is then circulated through the roasted beans for several minutes to lower the beans to room temperature. Water spray cooling may also be employed. The blower is then stopped. The bean discharge door 38 is swung open whereupon the roasted and cooled beans slide out of the chamber and into a suitable transfer container. The discharge door sidewalls 39 serve to guide the beans out of the chamber 12.

Continuous coffee roasting apparatus 80 employing the principles of the present invention is illustrated in FIGS. 5–8 and comprises three separate vertically descending stages: a dryer stage 82, a roaster stage 84 and a cooling stage 86. Unroasted coffee beans 24a are continuously fed into the dryer stage 82 via an inlet hopper 88 while roasted and cooled coffee beans 24b are discharged from the cooling stage 86 through a discharge chute 90 which is positioned over a moving horizontal conveyor belt 92. Rotary valves may be utilized to achieve air pressure differential seals at the inlet hopper 88 and discharge chute 90 if desired.

Figure 8:
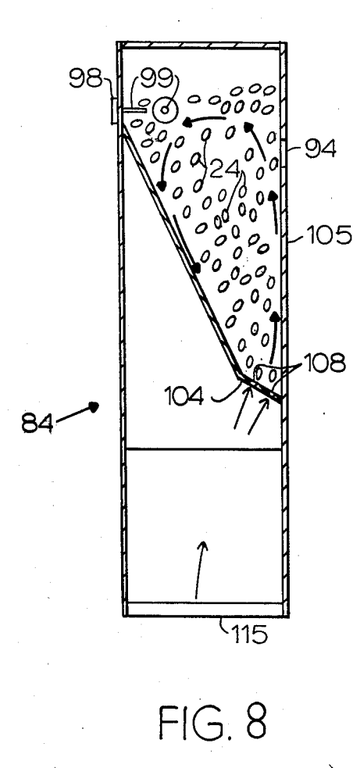
FIG. 8 is a sectional view in side elevation of the roaster stage of the apparatus of FIG. 5 taken along line 8—8 and shown with coffee beans in a dense fluidized recirculating mass.

Each stage 82, 84, 86 of the continuous roaster 80 is very similar in design and operation to the box-like roasting chamber 12 of the batch type roaster 10 except for the loading cover and unloading door. Sight glasses 94 are positioned in the front walls of each stage 82, 84, 86 to enable operator view of the operations occuring therewithin. A bean sampling tube 95 communicates with the chamber of each stage 82, 84, 86. Indicating thermometers 96, 98, 100 have sensitive thermocouple probes 97, 99 and 101 respectively extending into and transversely across the chamber of each stage so that bean process temperatures can be constantly and progressively monitored. Air distributor plates 102, 104, 106 having multiple spaced apart orifices 108, form the bottom walls in the chambers of the respective stages 82, 84, 86 and are aligned to form an acute angle with the front walls 103, 105, 107 of the stages as shown in FIG. 8.

Heated air plenums 112a, 112b, 114, 116 form the bottom portion of each stage 82, 84, 86 and have inlets 113a, 113b, 115, 117 which receive heated air from a source utilizing well known principles. The plenums deliver heated air to the distributor plates 102, 104, 106 of each respective stage at a controlled velocity sufficient to levitate the beans 24 into a dense and constantly recirculating fluidized mass of beans as with the batch roaster 10. The dryer stage 82 has two separate adjacent plenums 112a and 112b feeding air to the distributor plate 102. In the first plenum, the air may be warm spent air recirculating from the roaster stage 84 whereas the second plenum 112b may be hot air being supplied directly from a heating source. In this way the beans are gradually heated to drying temperature and heat is conserved through recirculation. However, the two dryer plenums 112a, 112b are not essential and could be replaced by a single plenum.

By adjusting the size and spacing arrangements of the orifices 108 in each distributor plate 102, 104, 106 and the velocity of the supply of heated air delivered to the inlets 113a, 113b, 115, 117 of the plenums, the beans 24 are moved by gravity longitudinally through each stage 82, 84, 86 as they recirculate in a vertical plane as a dense fluidized bed. In order to minimize "batch mixing" of beans from the discharge side to the inlet side of each stage, the length thereof is considerably more than the width. A length to width ratio of about six to one is satisfactory. A discharge weir 122, 124, 126 forms the lower sidewall of the discharge end of each stage, and continuous longitudinal bean flow occurs in each stage only as beans are discharged over the weir at the same rate that beans are added from the preceding stage or inlet hopper.

The dryer stage 82 is positioned above the roaster stage 84 which is likewise positioned above the cooling stage 86. This staggering arrangement enables gravity flow movement of beans from stage to stage via the interconnecting chutes 116 and 118. The dryer to roaster chute 116 communicates with the dryer chamber at a discharge port above the weir 122 and with the roaster stage 84 at an inlet port; and the roaster to cooler chute 118 forms a like connection. Alternatively, bean transfer from stage to stage may be accomplished mechanically as by bucket elevators employing well known principles.

The cooling stage 86 may include water spray apparatus 120 near the cooler inlet port to provide a quenching water spray for rapidly cooling the beans.

Green, unroasted coffee beans 24a having a typical moisture content of twelve to thirteen percent are admitted to the dryer stage 82 through the inlet hopper 88. The warm recycled air from the first plenum 112a levitates and heats the beans which are slowly moving longitudinally into the airstream coming from the second plenum 112b which is heated to an inlet temperature around 450°F. During the drying cycle, which averages about nine minutes, the beans are heated from ambient temperatures to about 400°F. and the moisture content in each bean is reduced to about 1 percent. At the discharge end of the dryer 82, the beans pass over the dryer weir 122 and fall down the transfer chute 116 and pass into the roaster stage 84.

The inlet temperatures in the roaster plenum 114 are higher than those in the dryer stage and are typically in the range of between 450° and 500°F. A temperature profile of the beans ranges from 400° to 425°F. and this profile is monitored by the thermometers 98 or by a chart recorder employing well known principles (not shown) attached to sensor probes 99 extending into and transversely along the fluidized mass of dense recirculating beans. The beans remain in the roaster stage for only about 1½ minutes. During this short roasting period, the beans swell, release chaff and undergo density reduction to about half that of green beans. The removal of chaff is accomplished conventionally with chaff cyclone separation apparatus such as the cyclone 18 shown connected in FIG. 2, to the batch roaster 10. Since chaff is only released during actual roasting, the continuous roaster apparatus 30 is actually simplified by having three separate stages. Also, processing temperatures are more easily controlled in three stages than in only one or two. At the discharge end of the roaster stage the beans pass over the roaster weir 124 and flow downwardly into the cooler stage 86 via the transfer chute 118.

The roasted beans are met by a water spray at the inlet to the cooling chamber which removes most of the heat within the beans by evaporation of water. Cooling air of ambient temperature in the cooler plenum 116 continues to fluidize the beans and enables rapid cooling down to about 100°F. during the cooling cycle which has a typical duration of about 5 minutes. The water spray can be adjusted by the operator by reference to a longitudinal temperature profile from probes 101 positioned longitudinally along the cooling section and registering on dial thermometers or a chart recorder (not shown). Thereafter, the cooled beans pass over the cooler weir 126 and down the discharge chute 90 to a conveyor 92 where they are carried to a packaging or grinding operation.

Figure 9:
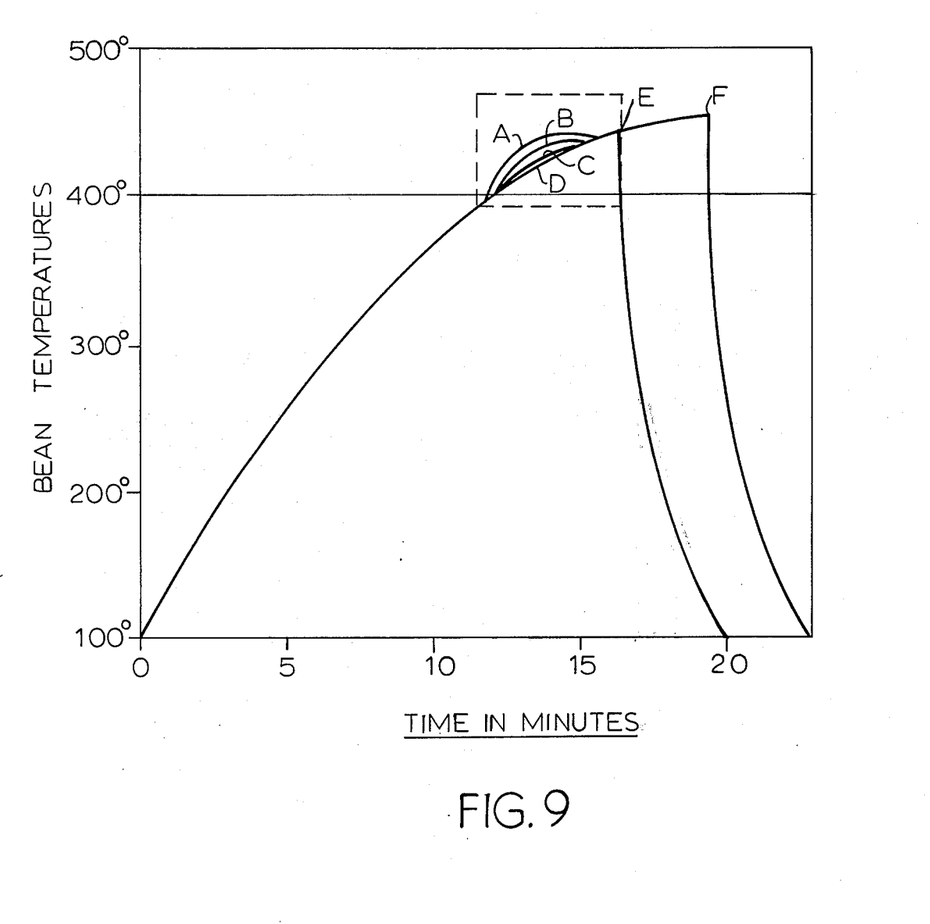
FIG. 9 is a chart graphing bean temperature as a function of time during a roasting cycle and illustrating pyrolitic bump.

FIG. 9 sets forth in graphical format the detectable thermal rises or bumps occurring within each coffee bean undergoing roasting in accordance with the present invention. During approximately the first 12 minutes of heating of coffee beans 24 the bean temperature rises gradually and virtually linearly from about 100° to 400°F. During this initial stage, the coffee beans are drying; they are not being roasted. Starting at about 400°F., true bean temperature, pyrolitic chemical reactions begin to occur within each bean and the bean temperature climb rate accelerates, resulting in the charted thermal bumps A, B and C of FIG. 9. These thermal bumps A, B and C may be detected during roasting to enable precise roast time control. In addition it has been found that the magnitude of the thermal bump indicated the nature of coffee beans being roasted and the flavor of the coffee beverage ultimately produced therefrom.

In FIG. 9 the charted bump A indicated that new crop wet processed mild coffee grades are being roasted. Curve B is indicative of roasting of wet processed older crop milds. Curve C indicates dry processed Brazils, and Curve D, having virtually no thermal bump, is indicative of the low grade dry processed Robusta coffee beans.

If the roasting process is terminated before the pyrolysis bump occurs, the beans will not have developed their peak flavors. If heating stops during the thermal bump, only some of the flavor will have been developed. If heating of the beans continues more than about 3 minutes after completion of the thermal bump period, the flavor and aroma producing aldehydes, etc., will be altered and driven off and the resultant beans will produce a dark roast taste which is lacking in aromatics.

A heat cut off point within the range between point E and point F on the curve of FIG. 9 may be selected to control the flavor characteristics of the final coffee product. Cutting off the heat at point E produces a light medium roast whereas cut off at point F results in a dark or Italian roast.

A chart recorder may be attached to the probe 50 of the batch roaster or the probes 99 of the roaster stage 84 of the continuous apparatus so that the phenomena displayed in FIG. 9 may be permanently recorded for each bath of beans, and such records are commercially useful in disclosing the quality of coffee roasted and the degree of roast achieved. Thus, the thermal bumps are indexes which document green coffee quality scientifically and objectively, as opposed to commonly employed subjective tasting procedures which are most difficult to document reliably. As previously explained, the magnitude of the thermal bump is directly related to desirable coffee flavor, that is, the greater the bump, the better tasting and more aromatic is the final coffee product. Sensing and recording inlet air temperatures, as with a chart recorder connected to the probe 60 of the batch roaster 10, enables control and optimization of processing times and conditions.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. Coffee bean processing comprising:
   a. housing means forming at least one processing chamber for a quantity of coffee beans undergoing processing, said housing means having air inlet means at the bottom of said chamber connected to blower means for creating a controlled updraft through said air inlet means in a first vertically extending updraft portion of said chamber, said housing means including interior wall means joined to said air inlet means, at least one part of said wall means diverging upwardly away from said air inlet means at an acute angle, another part of said wall means forming a second vertically extending downdraft portion of said chamber adjacent said updraft portion;
   b. said blower means for collecting ambient air and forcing it through said air inlet means with sufficient velocity to provide said controlled updraft so that said updraft levitates said coffee beans upwardly in said first vertically extending portion of said chamber and outwardly into said second vertically extending downdraft portion wherein said beans move downwardly to enter said first portion so that said quantity of coffee beans forms a dense recirculating fluidized mass; and
   c. heater means for heating said collected air before entry into said chamber as said controlled updraft to a predetermined coffee bean processing temperature, said heater means including limiting means for providing said heated air updraft with a temperature not in excess of 530°F.,
   whereby heat is transferred into the beans by convection from said heated updraft and by thermal conduction from bean to bean throughout the dense recirculating fluidized coffee bean mass to provide thermal equilibrium and a uniform roast.

2. The apparatus of claim 1 wherein said chamber forming means is substantially longer than the width thereof, and said air inlet means create a controlled updraft in said first vertically extending updraft portion of said chamber, said first portion extending continuously substantially the length of said chamber.

3. The apparatus of claim 2 additionally comprising coffee bean inlet means at one end of said chamber for admitting coffee beans continuously thereinto at a controlled rate and coffee bean outflow means at an opposite end for discharging said coffee beans continuously therefrom at said rate.

4. The apparatus of claim 3 wherein each said chamber has a length at least four times greater than the width thereof, and comprising in combination:
   a. a first said chamber for coffee bean drying;
   b. a second said chamber for coffee bean roasting adjacent to said first chamber;
   c. a third said chamber for coffee bean cooling adjacent to said second chamber;
   d. the outflow means of said first chamber communicating with the coffee bean inlet means of said second chamber and adapted to transfer coffee beans out of said first chamber into said second chamber;
   e. the outflow means of said second chamber communicating with the coffee bean inlet means of said third chamber, and adapted to transfer coffee beans out of said second chamber into said third chamber;
   f. said blower means connected to said first and second chambers;
   g. additional blower means for collecting air at ambient room temperature and forcing it into said cooling chamber with sufficient velocity to levitate coffee beans therein in a dense, recirculating fluidized mass.
   whereby coffee beans may be continuously dried, roasted and cooled in said apparatus.

5. The apparatus of claim 2 wherein each said chamber forming means includes a base plate, a front wall and a back wall joined to and extending upwardly from said plate, and said air-inlet means comprises a multiplicity of spaced apart orifices in said base plate, said orifices aligned to generate an airstream substantially tangential to the front wall, and end walls.

6. The apparatus of claim 5 wherein said front wall and said back wall are substantially wider than said end walls, and said base plate comprises a wide and shallow rectangular plate being joined along its wide edges to said front wall and said back wall, said plate being aligned to define an acute angle with respect to said front wall.

7. The apparatus of claim 5 wherein each said orifice defines a hole greater than 3/16 inch, and additionally comprises a screen of the size of the base plate, said screen having a mesh smaller than 3/16 inch and positioned over said base plate within said chamber.

8. The apparatus of claim 1 additionally comprising operable cover means enclosing the top of said chamber and adapted to enable the loading thereof with a charge of coffee beans; and further comprising an air exhaust opening at a top portion of said chamber.

9. The apparatus of claim 5 additionally comprising a bottom hinged drop down unloading door within said front wall and forming at least the lower portion thereof in a closed position; said door being hinged flush with said base plate and adapted to enable unloading roasted beans from said box when said door is in an open drop down position.

10. The unloading door of claim 9 additionally comprising upturned side lips to enable said door to serve as an unloading chute in an open drop down position.

11. The apparatus of claim 1 additionally comprising coffee bean temperature sensor means positioned within said second vertically extending downdraft portion of said chamber for intimately contacting beans therein to measure virtual true bean temperature and detect the occurrence of a pyrolitically induced thermal rise in said contacted beans, and further comprising indicating means connected to said temperature sensor means for indicating measured virtual bean temperature and the occurrence of said pyrolitically induced thermal rise.

12. The apparatus of claim 4 additionally comprising plural temperature sensor means positioned within and spaced across said downdraft portion of at least one of said chambers, said plural sensor means adapted for intimate contact with levitated beans therein to measure virtual true bean temperatures and the occurrence of a pyrolitically induced thermal rise in said contacted beans, and further comprising plural indicating means connected to said plural temperature sensor means for indicating virtual true bean temperatures and the occurrence of said pyrolitically induced thermal rise in said means.

13. The apparatus of claim 5 additionally comprising a sight glass mounted in at least one of said walls and enabling visual inspection of beans undergoing processing within said chamber.

14. The apparatus of claim 8 additionally comprising chaff removal means communicating with said exhaust opening.

15. The apparatus of claim 8 additionally comprising heated air recirculation means connected between said exhaust opening and said blower means.

16. The apparatus of claim 1 additionally comprising thermal insulation means surrounding said apparatus and adapted to reduce heat losses therefrom.

17. A coffee bean roaster comprising:
  a. a roasting chamber formed by a wide shallow rectangular base plate with a multiplicity of spaced apart orifices therein, a front wall meeting said plate at an acute angle and extending upwardly therefrom, a back wall extending upwardly from said plate and diverging away from said front wall and side walls extending upwardly from said plate and joined to said front wall and said back wall;
  b. a plenum connected to said chamber and communicating with said base plate;
  c. a blower in said plenum and adapted to collect air and force it through said orifices with sufficient velocity to levitate a charge of coffee beans in said chamber in a dense, recirculating fluidized mass of beans; and
  d. a heater element in said plenum and adapted to heat said collected air to a predetermined coffee bean roasting temperature not greater than 530°F., before said air is forced through said orifices.

18. The roaster of claim 17 additionally comprising:
  a. an exhaust opening at the upper end of one of said side walls;
  b. a hinged cover enclosing the top of said chamber;
  c. a bottom hinged drop down unloading door in said front wall, said door being hinged flush with said plate and having upturned side lips to form an unloading chute when said door is dropped down;
  d. a thermometer having a sensitive temperature sensor within said chamber and positioned to contact said recirculating beans at a point within the dense fluidized mass thereof and generally out of said airstream; and
  e. a sight glass in one of said walls positioned to enable viewing of coffee beans undergoing roasting.

19. The roaster of claim 17 additionally comprising heated air recirculation means and chaff removal means communicating with said chamber and said plenum.

20. Coffee bean processing apparatus comprising:
  a. housing means forming at least one processing chamber for holding a quantity of coffee beans, said chamber having means for defining an undraft portion and a recirculation portion, said housing means connected to blower means and containing airstream directing means creating a controlled updraft in said updraft portion of said chamber;
  b. said blower means to collect ambient air and force it into said chamber through said airstream directing means with sufficient velocity so that said updraft lifts coffee beans in said updraft portion of said chamber to move said quantity of coffee beans into said recirculation portion as a dense, recirculating fluidized mass; and
  c. heater means for heating said collected air before entry into said chamber as said controlled updraft to a predetermined coffee bean processing temperature, said heater means including limiting means for providing said heated air updraft with a temperature not in excess of 530°F;
  d. coffee bean temperature sensor means positioned within said chamber in said recirculation portion and completely outside of said controlled updraft portion, said sensor means for contacting said dense recirculating mass of coffee beans and operable for sensing the occurrence of pyrolitically induced thermal rise in said quantity of coffee beans undergoing heating; and
  e. temperature indicator means connected to said temperature sensor means and operable for indicating measured virtual coffee bean temperature in said chamber and the occurrence of pyrolitically induced thermal rise in said quantity of heated coffee beans.

21. The coffee bean processing apparatus of claim 20 wherein said coffee bean temperature sensor means is operably connected to said limiting means for automatic control of the temperature of said heated air updraft in said chamber.

22. The coffee bean processing apparatus of claim 20 further including timer means connected to said heater means and to said blower means for automatically controlling the processing time of said apparatus.

23. The coffee bean processing apparatus of claim 22 wherein said timer means is operably connected to said temperature sensor means for automatically controlling the processing time of said apparatus in response to the sensed occurrence of pyrolitically induced thermal rise in said quantity of coffee beans undergoing heating by said air updraft.

24. The coffee bean processing apparatus of claim 20 additionally comprising thermal insulation means secured to said apparatus for reducing heat losses therefrom.

* * * * *